UNITED STATES PATENT OFFICE.

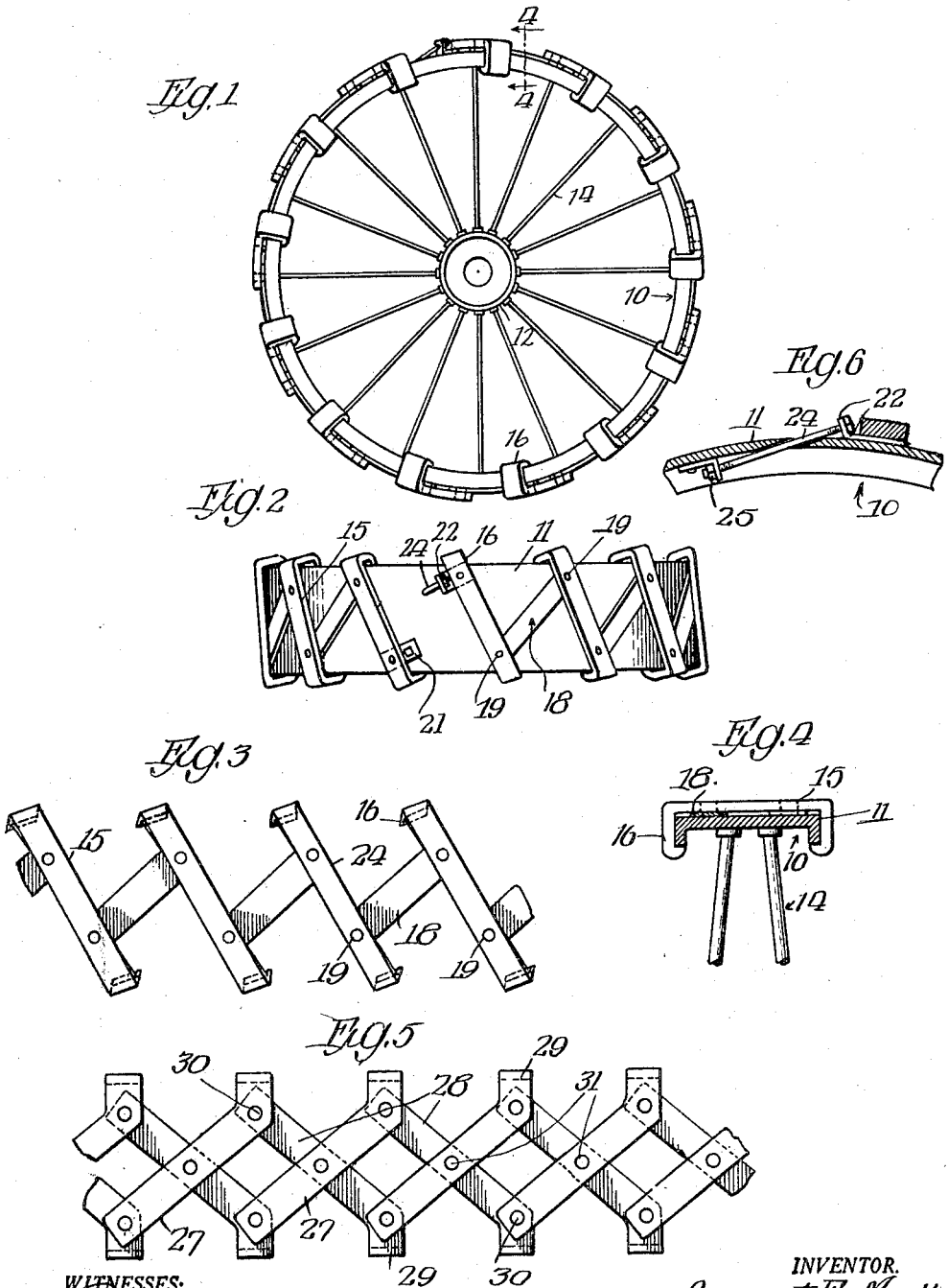

AUGUST E. MUELLER, OF CHICAGO, ILLINOIS, ASSIGNOR OF ONE-THIRD TO THOMAS J. HRUBY AND ONE-THIRD TO JOHN O. HRUBY, OF CHICAGO, ILLINOIS.

VEHICLE-WHEEL TREAD.

1,205,653.      Specification of Letters Patent.      Patented Nov. 21, 1916.

Application filed June 17, 1916. Serial No. 104,151.

*To all whom it may concern:*

Be it known that I, AUGUST E. MUELLER, a citizen of Argentina, South America, and a resident of Chicago, in the county of Cook and State of Illinois, have invented certain new and useful Improvements in Vehicle-Wheel Treads; and I do hereby declare that the following is a full, clear, and exact description thereof, reference being had to the accompanying drawings, and to the characters of reference marked thereon, which form a part of this specification.

This invention relates to a novel tread for vehicle wheels and is more especially adaptable to wheels having solid treads or tires as distinguished from wheels having pneumatic tires.

The tread herein shown has been more especially designed for wheels for tractors for agricultural uses, but may be applied also to wheels having solid cushioned tires.

Among the objects of the invention is to provide a simple, effective and inexpensive tread which is adaptable to wheels having different width tires or rims, and to provide a tread which may be readily applied to and removable from the wheel.

Other objects of the invention are to improve and simplify vehicle wheel treads or grips, and the invention consists in the construction and arrangement of the parts shown in the drawings, described in the specification and pointed out in the appended claims.

In the drawings:—Figure 1 is a side elevation of a wheel equipped with my improved tread. Fig. 2 is a top plan view thereof. Fig. 3 is a diagrammatic view of a section of the tread. Fig. 4 is a section on the line 4—4 of Fig. 1. Fig. 5 is a diagrammatic view of a slightly modified form of tread. Fig. 6 is a detail showing the manner of fastening the tread structure in place.

First, referring to the construction shown in Figs. 1 to 4 inclusive, 10 designates as a whole a wheel which as herein shown is a metal wheel having a broad faced rim or tire 11 and a hub 12 connected to the rim by spokes 14. The grip or tread shown in said figures comprises a series of metal bars 15 which are disposed obliquely across the face of the rim 11 and are provided at their ends with hooked portions 16 which are adapted to engage over the side edges of the rim 11, said hooked portions engaging under the rim in the manner best shown in Fig. 4. The hooked portions of the bars 15 are slightly offset from the longitudinal axes of the bars, as best shown in Figs. 1 and 2. The said bars are connected by links 18 which are joined at their ends by pivot connections 19 to the bars near the hooked ends of the latter. Said links are disposed obliquely across the face of the wheel at acute angles to the bars 15, each link being pivotally connected at one end to a bar near one side of the rim and at its other end to a neighboring bar near the other side of the rim. The construction described produces a flexible collapsible tread structure, the parts of which may be collapsed upon each other by bringing the bars 15 together in parallel relation, as permitted by the pivotal connections of the links 18 therewith.

In applying the tread to the wheel, the end bar at one end of the tread structure may be fixedly attached to the wheel rim by means of a short anchoring lug 21 which is attached to one end of said end bar. The other end may be adjustably connected to the rim through the medium of an L-shaped lug 22 that is connected to the other end bar of the series and a screw-threaded adjusting rod 24 which extends at one end through the aperture in said fitting or lug 22 and at its other end through an opening pierced obliquely through the rim. The end of the rod at the inner side of the rim receives a nut 25, through the medium of which and the rod 24 and fitting 22 a holding and tightening tension may be exerted on the tread structure.

With the construction described, it will be understood that the bolt 24 and nut 25 are relied upon to hold the tread structure tightly about the wheel in a given adjustment. When applying the structure to the wheel rim one end of the structure is attached through the lug or fitting 21 permanently to the wheel. Thereafter beginning with said latter end of the series of bars or tread structure, the said bars are fitted to the wheel rim at the proper oblique angle, depending upon the width of the rim, the bars and other connecting links or strips being thus adjusted from the attached end to the free end of the structure. The free end of the structure is afterward locked to the rim by the bolt 24 and the nut 25. In the event that the structure stretches so as to cause the same to become loose on the wheel, the additional length may be taken up by the adjustable fastening means described.

The angle of the bars 15 with respect to a plane passed through the axis of the wheel and parallel with said axis depends upon the width of the wheel rim. That is to say, a tread structure having tread or gripping bars 15 of a given length are adapted to be adjusted to wheel rims of different widths. In the adjustment of the structure to the maximum width of rim, the bars 15 will be approximately parallel to the plane of the axis of the wheel, while in the adjustment thereof to the narrowest wheel rim the said bars 15 will be disposed at a sharp oblique angle to said plane. In adapting a tread structure of a given size to a narrow wheel rim, one or more of the bars 15 may be omitted, and, likewise, in adapting the structure to a wider faced wheel, one or more of said bars 15 may be added.

It will be noted that the structure described constitutes a very effective gripping tread for a vehicle wheel, and, further, that the construction is such that the tread is inexpensive to make and extremely simple to apply. Moreover, when the tread structure is not in use it may be collapsed to occupy a very small space.

In the construction shown in Fig. 5, the tread structure comprises a plurality of pairs of cross bars 27, 28, respectively, the latter as herein shown lying under the former. Each bar of each pair is provided at one end with an offset hooked portion 29, and said hooked portions are adapted to engage over the edge of the rim in the same manner as the hooks 16 in the construction before described. The bars 27 of one set are arranged parallel with each other, and their hooked end portions 29 are all arranged at one side of the rim while the bars 28 are arranged crosswise with respect to the bars 27 and with their hooked ends all engaging the other side of the wheel rim. The other ends of the bars of each set are pivotally connected by rivets 30, or like fastening means, to the hook-bearing ends of the bars of the other set. The bars of each set are also pivotally connected at their intersecting or crossing points by rivets 31 to the bars of the other set.

The manner of mounting the tread structure shown in Fig. 5 on the wheel may be the same as that set forth in connection with the previously described structure. It will be apparent that the said tread structure is capable of being folded or collapsed to occupy small space when not in use.

It will be understood that the invention is capable of assuming other structural details within the spirit and scope of the invention and that the invention is not limited to the structure herein illustrated except as the same is made the subject of specific claims.

I claim as my invention:—

1. A tread structure for vehicle wheels extensible and collapsible in the direction of its length comprising a series of parallel bars extending across the tread face of the wheel from side to side of said tread face and flexibly connected together between their ends on the face of the wheel so as to be capable of being collapsed, and means whereby the tread structure may be fastened on the wheel rim.

2. A tread structure for vehicle wheels collapsible and extensible in the direction of its length, comprising parallel bars which extend entirely across the wheel rim, said bars being provided at their ends with hooks to engage over the edges of the rim, and links, shorter than said bars, extending across the rim and pivotally connected to the bars on the face of the rim.

3. A tread structure for vehicle wheels comprising flexibly connected, loosely jointed parallel bars which are adapted to extend diagonally and entirely across the wheel rim, said bars being provided at their ends with hooks obliquely offset to the longitudinal axis of the bars, to engage over the edges of the rim, and parallel tread-forming links shorter than said bars and loosely connected to said bars between their hooked ends.

4. A tread structure for vehicle wheels, collapsible and extensible in the direction of its length, comprising a series of parallel bars to extend diagonally across the face of the wheel rim and provided with hooked ends to engage over the edges of the wheel rim, and links, parallel to each other and at an oblique angle to said bars, pivotally connected to said bars inside the hooked ends of the latter and arranged at such angle to the bars, whereby the angle of said bars to the plane of the axis of the wheel may be varied to adapt the tread structure to wheel rims of varying widths.

5. A tread structure for vehicle wheels, comprising a series of bars adapted to extend diagonally across the wheel rim and provided at their ends with hooks to engage over the edges of the rim and links shorter than said bars and disposed at oblique angles to said bars extending between and pivotally connected to adjacent bars near their opposite ends but inside of the hooked ends of the latter, the bar at one end of the series having means to fix it to the wheel rim near one side of said rim, and the bar at the other end of the series having means to adjustably connect it to the wheel rim near the other side of said rim.

In testimony whereof, I have hereunto set my hand at Chicago, Illinois, this 14th day of June, 1916.

AUGUST E. MUELLER.

Witnesses:
WILLIAM L. HALL,
M. G. ADY.